Oct. 19, 1937.   W. A. V. THOMSEN   2,096,312

PERMANENT WAVING

Filed Oct. 30, 1935

INVENTOR.
William A. V. Thomsen
BY
Morgan, Finnegan and Durham
ATTORNEYS.

Patented Oct. 19, 1937

2,096,312

UNITED STATES PATENT OFFICE 2,096,312

PERMANENT WAVING

William A. V. Thomsen, Plainfield, N. J., assignor, by mesne assignments, to American Machine and Metals, Inc., New York, N. Y., a corporation of Delaware Application October 30, 1935, Serial No. 47,349

9 Claims. (Cl. 132—36)

The present invention relates to permanent waving and more particularly to a novel and improved heater for heating the wound curls in the process of permanent waving.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serve to explain the principles of the invention.

Figure 1:
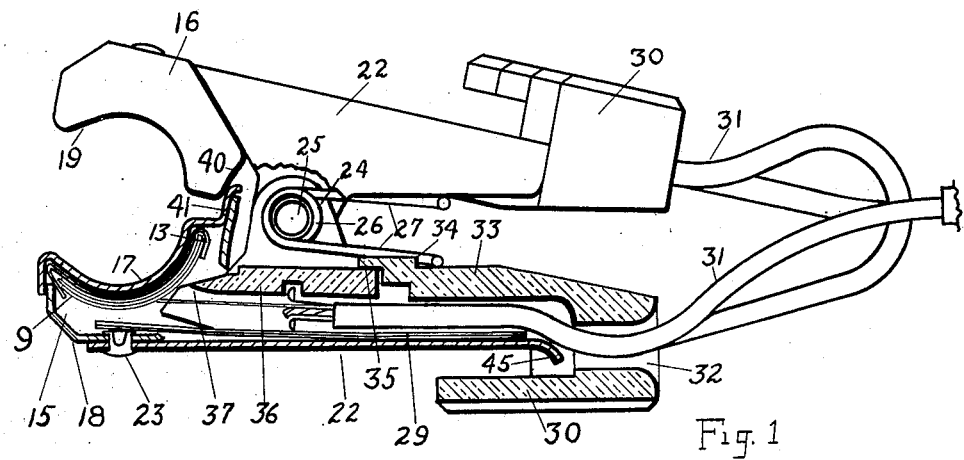
Figure 1 is a fragmentary top view with certain parts broken away, of an illustrative embodiment of the present invention.
Figure 2:
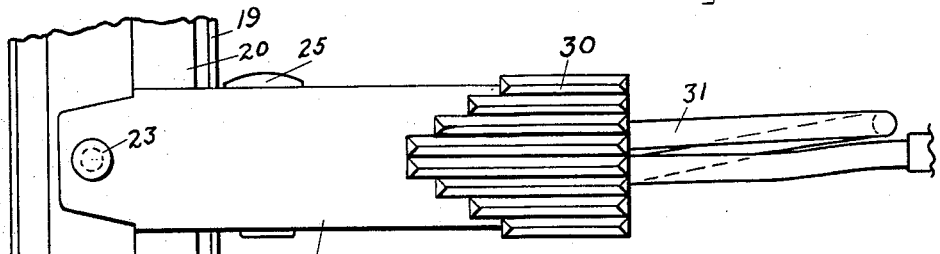
Figure 2 is a fragmentary side elevation of the embodiment shown in Figure 1.
Figure 3:
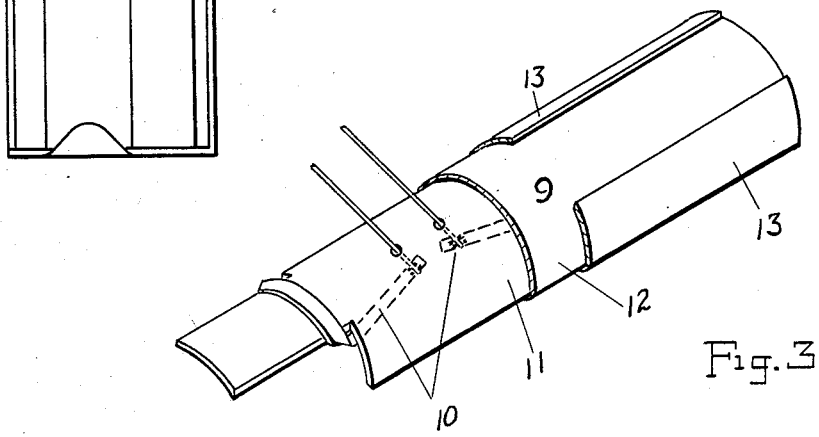
Figure 3 is a perspective view, with parts broken away, of a heating element assembly used in connection with the embodiment shown in Figures 1 and 2.

The present invention has for its object the provision of an improved permanent waving heater which is more comfortable to the customer and is more efficient in operation than those heretofore generally used. A further object is the provision of a permanent waving heater which concentrates the heat on the curl enclosed within the heater. Still another object is the provision of a heater of the Croquignole type in which the handles are maintained sufficiently cool to be grasped by the operator by minimizing the conduction of heat away from the heating elements. The invention also provides a permanent waving heater in which the heat is economized by preventing excessive conduction and radiation away from the curl.

Referring now in detail to the illustrative embodiment of the present invention, as shown in the accompanying drawing, which embodiment is particularly designed for use in the Croquignole process of permanent waving of hair, each of the heaters comprises a pair of heating elements contained within enclosing shells which are mutually pivoted and resiliently urged towards each other and into contact with the curl to be heated and permanently waved. The heating elements and shells are preferably relatively long and narrow, and on the adjacent sides are concave so as to closely conform to the shape of the wound curl.

As embodied, each heating element 9 comprises a suitable length of resistance wire 10 bent back and forth upon itself to form a relatively thin, long and narrow member having considerable flexibility, and may, if desired, be supported on a supporting member such as a sheet of mica 11. This heating element is enclosed in an electrically insulating wrapper 12 which may also be of mica, and the heating element is held in a curved form and its heat is uniformly distributed by means of a sheath 13 of aluminum or other good conducting metal, secured to the mica wrapper 12 by folding over of the sheath edges.

Each of the heater elements is enclosed in its individual shell 15 or 16 which comprises a hollow metal body, each preferably formed of two aluminum stampings 17, 18, 19 and 20, which are secured together, one stamping including the outer wall while the other stamping includes the other wall. These shells have their adjacent faces concave so as to conform generally to the shape of the wound curl, and are of sufficient thickness to permit spacing of the heater element 9 from the shell walls 18 or 20, thereby providing a considerable degree of heat insulation between the heater and the outer wall 18 or 20. Preferably, the inner surface of the concave walls 17 and 19, and if desired the outer surface of the concave walls, is blackened so as to increase its heat absorption and radiation from the heating element, while the inner and outer surfaces of the outer wall 18 or 20 are polished so as to minimize their heat absorption and radiation. The sheath 13 is also preferably blackened on both its sides for the same purpose, and the heating efficiency is further increased due to the fact that the concave walls 17 and 19 and outer walls 18 and 20 are separate parts, thereby reducing the amount of heat conducted from the blackened parts 17 and 19 to the polished parts 18 and 20. Where the heater sheath 13 is in contact with the inner blackened surface of the concave wall 17 or 19, the heat transfer is by conduction, but at those points where these parts are out of contact, the heat is transferred nearly as well due to the blackened surfaces which permit heat transfer unimpeded radiation and absorption.

The two enclosed heating elements are pivotally mounted with respect to each other and are resiliently urged towards each other and thereby into firm contact with the curl to be heated and waved. For this purpose, a laterally projecting extension 22 is mounted on each of the heater shells 15 and 16. These extensions are mutually pivoted and a spring between them urges the extensions apart and the shells together. As embodied, each of the extensions 22 comprises a channel of relatively thin yet strong sheet metal, such as steel, having a small total cross sectional area, and secured to the heater shell by means of a rivet 23. Each of the channels is provided with an apertured ear 24, through which passes a pivot pin 25 by which these parts are pivotally mounted on each other. About the pivot pin 25 is coiled a spring 26 having its ends 27 extending outwardly of the extensions 22 and serving to press these extensions apart.

At the outer ends of the extensions are mounted handles 30 by which the operator may grip the heater to place it on or remove it from the curl, these handles also serving as guides for the conductors 31 lying in channels 22 and supplying power to the resistance heating elements 9. Conductors 31 are spaced from channels 22 by a sheet of mica 29. As embodied, the handles 30 are formed of molded plastic and have an aperture 32 therethrough to receive the conductors 31. Each handle is provided with a tongue 33 having a shoulder 34 cooperating with the bent ends of spring 26 to hold the handles against detachment, while facilitating their original assembly. On their under side, handles 30 are recessed, as at 35, to fit over the insulating plate 36, of porcelain, and secure it in position. Plate 36 also extends into its shell 15 or 16 to hold the heater element 9 in position by the end 37 of plate 36.

For preventing excessive escape of steam from the curl while heating, the heaters on their adjacent edges are closely fitted together and at least one is provided with a curved edge contacting an edge of the other heater. As embodied, wall 19 is formed with a concave portion 40, concentric with pivot 25, while wall 17 is formed with a convex lip 41, also concentric with pivot 25, and these lips are closely fitted together so that in all working positions of the heaters, a closure is formed between the two shells throughout the length of the heater.

The guiding aperture in each of the handles 30 also serves to assist in maintaining the handles cool, and the outer end of extension 22 is bent over, as at 45, to provide a bushing for the conductor 31 as well as to further assist in holding the handle 30 on the end of extension 22.

In the operation of the illustrative heater, current is supplied at low voltage to the heating element 9, and due to the blackened surfaces of sheet 13 and walls 17 and 18, heat is easily transferred from the heating element 9 to the wound tress of hair to be permanently waved. The polished inner and outer surfaces of walls 18 and 20 minimize the radiation of heat away from the curl, while the coacting surfaces 40 and 41 prevent the excessive escape of steam from the curl. Due to the small cross-sectional area of the extensions 22, and their small area of contact with the heater shells 15 and 16, and also due to the relatively low conductivity of the metal of which extensions 22 are formed, only a small amount of heat is lost by conduction away from the shells and the handles 30 are maintained comfortably cool.

Although the blackened surfaces may be blackened in any desired manner, this is preferably carried out on the aluminum parts by forming the oxide electrolytically and reacting the oxide to form a black complex hydroxide, and for this purpose the process known as "alumiliting" may be conveniently used.

What I claim is:—

1. A permanent waving heater including in combination a pair of heater shells in which are enclosed resistance heating elements, said shells each comprising a relatively long and narrow member, and said shells having their adjacent faces longitudinally concave, an extension projecting laterally from each shell, and pivot means on the extensions for mutually pivoting the shells, said shells being formed with an interfitting tongue and groove on their edges between the concave faces and the pivot means for preventing excessive escape of steam in use.

2. A permanent waving heater including in combination a pair of heater shells in which are enclosed resistance heating elements said shells each comprising a relatively long and narrow member, and said shells having their adjacent faces longitudinally concave, an extension projecting laterally from each shell, and pivot means on the extensions for mutually pivoting the shells, one of said shells being formed with a tongue on its edge between the concave faces and the pivot while the other shell is provided with an interfitting groove to receive the tongue, said tongue or said groove having a curved edge substantially concentric with the pivot whereby the space between the shells is closed in various relative positions of the shells.

3. A permanent waving heater including in combination a pair of heating elements enclosed in shells, an extension attached to each shell, a handle at the end of each extension, means for mutually pivoting the extensions and shells on each other, a spring attached to the extensions and engaging the extensions and handles for resiliently moving the shells together and for holding the handles fixed to the extensions.

4. A permanent waving heater including in combination a pair of heating elements enclosed in shells, an extension attached to each shell, a handle at the end of each extension, means for mutually pivoting the extensions and shells on each other, a spring wound about the pivot means and having its ends projecting towards and into engagement with the handles whereby the handles are resiliently urged apart and are releasably held on the extensions.

5. A permanent waving heater including in combination a pair of heating elements enclosed in shells of good conducting metal each having an extension having a relatively small cross section and formed of poorly conducting metal, a handle of heat insulating material attached to each extension and pivot means between the extensions for mutually pivoting the heater shells and enclosed elements.

6. In a permanent waving heater the combination of a pair of heating elements enclosed in and spaced from shells of good conducting metal and in which the adjacent walls of the shells are blackened on at least one side to increase the heat transferred to a curl between the shells.

7. In a permanent waving heater the combination of a pair of heating elements enclosed in and spaced from shells of good conducting metal and in which the heating elements are wrapped with heat insulating material and are enclosed within a blackened sheath spaced from the shell over the major portion of the sheath.

8. A permanent waving heater including in combination a resistance heating element, a hollow shell enclosing the heating element and from one wall of which the element is spaced, said shell being formed of good conducting metal and having at least one side adjacent the curl to be heated blackened to increase the proportion of heat transferred to the curl.

9. A permanent waving heater including in combination a resistance heating element, a hollow shell enclosing the heating element, the element and one of the shell walls being spaced from each other for the major portion of their area, said shell being formed of aluminum and having at least one of its sides adjacent to the curl to be heated blackened to increase the heat transferred to the curl.

WILLIAM A. V. THOMSEN.